June 2, 1936.  G. BERGSTROM  2,042,579

PREVENTION OF BARK DISEASES IN PLANTS

Filed June 18, 1935  2 Sheets-Sheet 1

INVENTOR.
Gunde Bergstrom,
BY Arthur P. Knight &
Alfred W. Knight
ATTORNEYS.

June 2, 1936.  G. BERGSTROM  2,042,579
PREVENTION OF BARK DISEASES IN PLANTS
Filed June 18, 1935   2 Sheets-Sheet 2
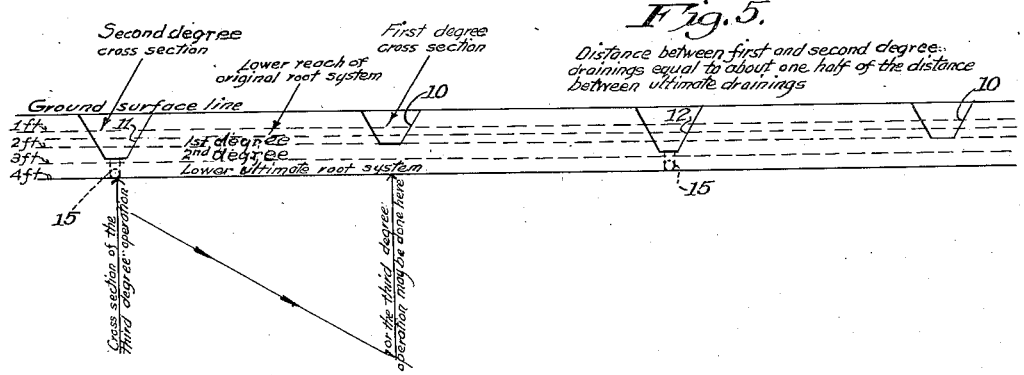
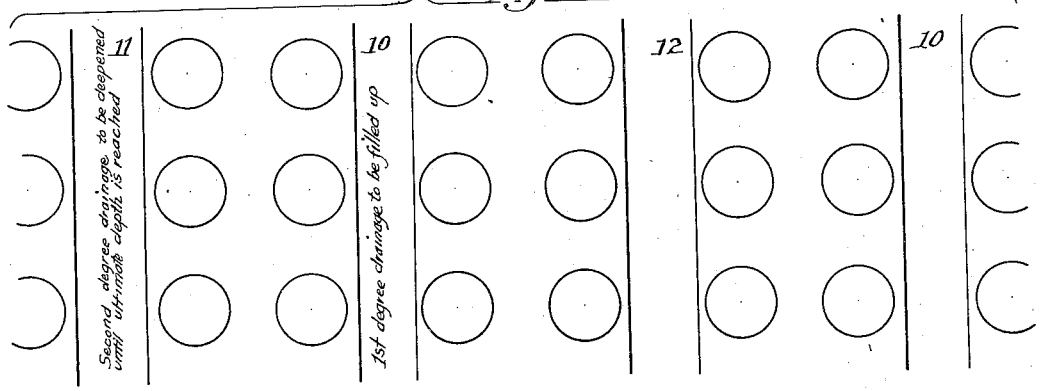
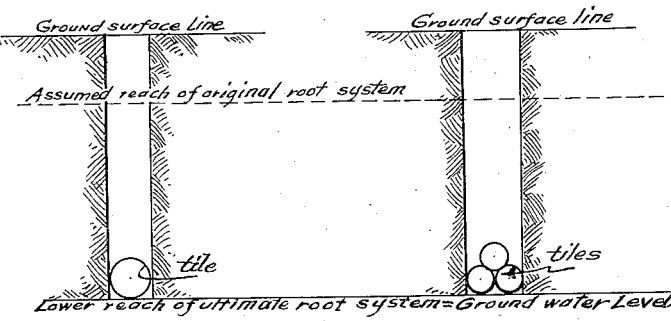 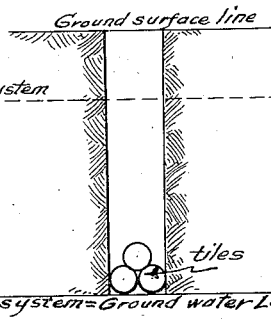 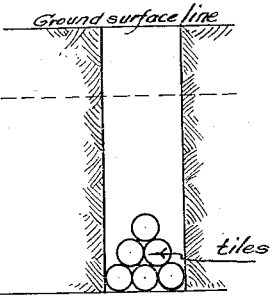
INVENTOR.
Gunde Bergstrom,
BY
ATTORNEYS.

Patented June 2, 1936

2,042,579

UNITED STATES PATENT OFFICE 2,042,579

PREVENTION OF BARK DISEASES IN PLANTS

Gunde Bergstrom, Los Angeles, Calif.

Application June 18, 1935, Serial No. 27,152

2 Claims. (Cl. 47—58)

This invention relates to the prevention of bark diseases in fruit trees or other trees or plants and the main object of the invention is to provide for eliminating the primary causes of such diseases by the method hereinafter set forth.

It is a known fact that bark diseases in fruit trees are produced by various species of fungi, feeding on materials present in the sap and its adjoining tissues, such fungi gradually penetrating into the wood of the tree and causing it to die sooner or later.

Heretofore the treatment of fruit trees in order to prevent deterioration or destruction thereof by bark diseases has been by spraying or other operations tending to more or less delay the spreading of the disease in attacked trees, but none of such methods prevents the fungi attacks or eliminates the primary causes of such attacks.

Sound bark on live trees in healthy condition of growth is proof against attacks of fungi and their spores, and the main object of the present invention is to insure that the tree will be maintained in sufficiently uniformly vigorous condition to insure adequate resistance to the attacks of fungi throughout substantially its normal life.

After investigation of the effects of variation in climatic conditions and in soil conditions, etc., on the growth of the plants and on the susceptibility of the plants to be attacked by fungi, I have concluded that if the normal condition of vigorous growth of the plants can be maintained without undue variation, such plants should be substantially immune to attack by fungi, and that in cases where the plants are not so immune the primary cause of such lack of immunity will generally be found to be due to the undue variation in the growth and vigor of the plants, and for reasons hereinafter set forth, such undue variations or irregularities will generally be found to be due to conditions leading to limitation of the effective root growth and activity of the plants to a zone so near the surface of the ground that the plants are subjected to excessive variation in conditions of temperature, moisture, etc., resulting in undue variation in the growth and vigor of the plants.

An important object of the present invention is to produce and maintain a condition in which the root system of the trees or plants is established at a sufficient distance below the surface of the ground, such that the temperature and soil conditions at the position of the root system are sufficiently uniform to prevent undue variations in plant growth and vigor, and thereby prevent existence of conditions favorable to development of attack by fungi. In order to effect the development of the root system at the required depth, it is necessary to start with the root system at a comparatively shallow depth and to effect a progressive or gradual lowering of the effective root system of the fruit trees or plants, this being accomplished by providing drainage ditches or means which are progressively lowered to successively greater depths in such manner that the zone of greater root development or activity is caused to progressively descend to greater depths, thereby eliminating the injurious effects of climatic and soil conditions which would otherwise tend to produce undue variation or irregularity in the growth or vigor of the tree or plant and thereby render the bark of the tree or plant susceptible to attack by fungi as above stated.

The accompanying drawings illustrate the several steps involved in the carrying out of my invention as applied, for example, to an orchard of fruit trees, and referring thereto:

Figs. 1, 1—a, 1—b, and 1—c show in diagrammatic vertical section the successive steps in the treatment of a portion of such an orchard;

Fig. 5 is a diagrammatic vertical section; and

Fig. 6 is a partial plan view illustrating a form of the invention in which the progressive deepening of the drainage ditches or channels is carried out to different extent in different ditches; and Figs. 7, 8, and 9 are diagrammatic vertical sections illustrating different methods of forming eventual or permanent sub-drains.

Figure 1:
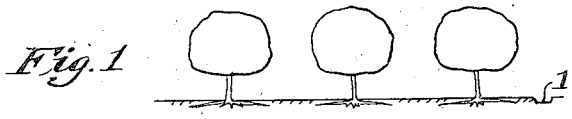

Before explaining, in detail, my method of preventing bark disease in groves of fruit trees, etc., it may be noted that the soil of the groves, and the vegetation growing therein shelters an abundance of fungi and their spores; they are present on the trees themselves, and in the air surrounding them. Different species may grow under different conditions, each species having a maximum and a minimum requisite of nourishment, moisture and temperature. If the proper conditions are lacking they may lie dormant, but they develop as conditions change in their favor. They are always ready to attack where new feeding grounds are opened up.

Sound bark on live trees is proof against attacks of fungi and their spores, but the tree is not fungi proof where it has been damaged to such an extent that the inner bark layers have been exposed. Such a condition of the inner layers may result from the conditions of growth of the plant or from accidental causes such as pruning, bruising, etc., but the present invention relates only to the prevention of such condition arising from the conditions of growth of the tree or plant. A condition of fractures in the bark of a tree exposes the inner bark to attack by such spores or fungi and when such a condition is accompanied or followed by a condition of lowered vitality in the bark, the fungi will develop and spread rapidly within the growing tissues of the tree.

Investigation of the distribution of scaly bark diseases or fungus diseases indicates that it is most liable to occur either in regions where the soil is heavy and liable to remain excessively wet except at the surface, or in regions where the climatic conditions are subject to excessive or sudden unfavorable changes. These facts indicate that the predisposing cause of fungi attack, aside from the general presence of fungi or their spores, is the existence of conditions leading to undue variation in the growth and vitality of the tree or plant. In the case of heavy soil there is a tendency for the root system of the trees or plants to remain comparatively near the surface of the ground and under such conditions sudden or excessive variations in climatic conditions such as temperature and moisture, will result in undue variation in the growth and vitality of the tree or plant.

In tropical and semi-tropical regions, the climatical and soil conditions give cause to an early start of the growing season. In most places, the growing conditions are extremely good during a period of the first part of the season.

It is particularly true for such regions as California and Florida, that unfavorable climatical changes, such as cold and cloudy weather, subsequently ensue. These may retard, or interrupt, the function of the leaves, and, as a consequence, the downward-moving afflux is influenced accordingly.

A number of factors, more or less confined to, and characteristic of, the tropical and semi-tropical regions, contribute, directly or indirectly, in bringing about a forceful start of the early tree growth. The most essential of these are:

As a result of heavy rains during the rainy season, and more or less water-logging the ground by irrigations at short intervals during the balance of the year, causing an insufficient soil ventilation, the plant food builders are forced to the top soil layers;

Whereas in cold countries, the production of food stuffs in the soil is considerably retarded during the dormant season, the temperature of the soil within warmer regions permits the production of nourishment also during the dormant season. Thus, an accumulation of food stuffs is stored up and ready for use by the trees, when they start their seasonal life process;

Because of the facts stated above, the root system of the trees spreads out within a thin zone, close to the surface of the ground. The depths of the root systems may vary somewhat, thus they are more shallow on clayey soils, where the "water-logged" condition develops, and they are deeper in sandy soils, through which the water percolates easier, and to which the air has a better entry;

The thin zone of the top soil, in which the root system is located, is quickly warmed up by the sun and the atmospheric temperature. Insofar as the soil temperature is comparatively high during the dormant season, it rises that much sooner, during the first warm spells, to a degree favoring a forceful growth of the trees;

In tropical and semi-tropical regions, the climatical conditions during the rainy season, and during a period subsequent to it, are the most favorable for the growth of fungi. In most places, this period overlaps the beginning of the growing season. Providing that fractures have been developed in the bark and that, later on, there has been a check to the downward-moving afflux, and if this has taken place while the fungi growth is at its best, then the risk of attacks is at its maximum.

The thin top soil zone, in which the roots are situated, dries up rapidly during the growing season as the atmospheric temperature raises, and as the humidity in the air is lowered; and winds enhance such drying.

The trees themselves contribute to the draining of the section of the top soil, in which their roots are located, by taking up water necessary for their life process. The trees' demands for water increase according to the rise in atmospheric temperature, the brightness of the sunshine, and the force and dryness of winds.

When the top soil has become sufficiently dry, the growth of the trees as well as the foodstuff-forming processes in the top soil layers, are violently checked. This condition may be brought about, either between the end of the rainy season and the time of the first artificial irrigation, or during the latter part of periods between subsequent irrigations.

If the function of the tree is thus checked after a period of vigorous growth, during which bark fractures have developed, the spores and fungi lodging in the fractures will develop, giving the start to the bark disease.

The conditions described above may be more or less interwoven, and the cases may vary indefinitely according to the large number of factors and circumstances related to the life processes of trees and fungi.

In semi-tropical regions, where the growing season starts early, and may be succeeded by a period of unfavorable climatical conditions, causing interruptions and abatements of the downward-moving afflux in the trees, it is essential to prevent an early forceful growth, which may produce bark fractures before the weather conditions have become settled.

In tropical, semi-tropical and temperate climates, where the section of the soil in which the root system is situated may dry out between rains and irrigations, it is essential to assure the trees of a sufficient and uniform moisture supply to draw from, thereby preventing a check to the sap flow.

The most inexpensive and practical manner in which to meet the requirements called for above, is to gradually lower the root system to a proper final depth, such depth varying according to topographical, climatic, and soil conditions. It has been estimated that in no case the root system needs to be lowered more than six feet, figured from the ground surface line, and the average depth may stay at about four feet. Such procedure can only be accomplished by the construction of drainages, open or covered, placed at the depth to which the root system has to be lowered.

Figs. 1, 1—a, 1—b, and 1—c diagrammatically illustrate successive stages in the progressive draining of the soil to gradually lower the root system of the trees according to this invention. The stage shown in Fig. 1 represents the initial or starting condition of the trees with the root system comparatively close to the surface 1 of the ground and without any drainage provision. Stages shown in Figs. 1—a and 1—b represent the same trees with drainage ditches 2 and 3 at progressively greater depths, and stage shown in Fig. 1—c represents the final condition with the final drainage ditch 4 at sufficient depth to maintain the root system of the trees at sufficient distance below the surface of the ground to avoid undue changes in the plant growth and vitality by reason of climatic changes.

Figure 2:
Figs. 2 and 3 are diagrammatic vertical sections showing different methods of progressively increasing the drainage depth.
Figure 2:
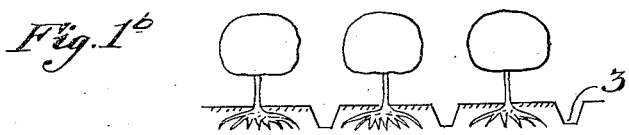
Figure 2:
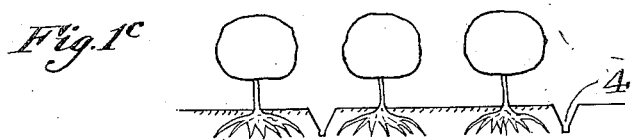
Figure 2:
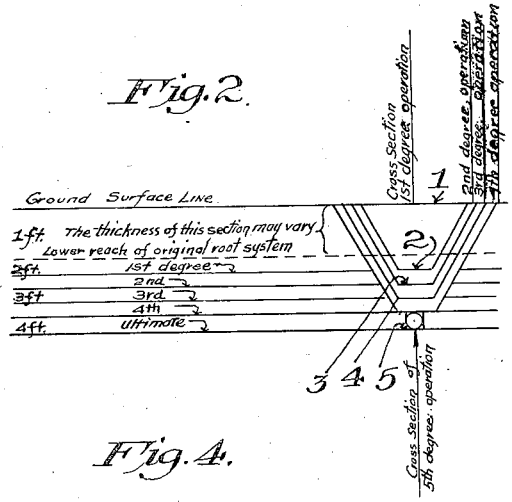
Figure 3:
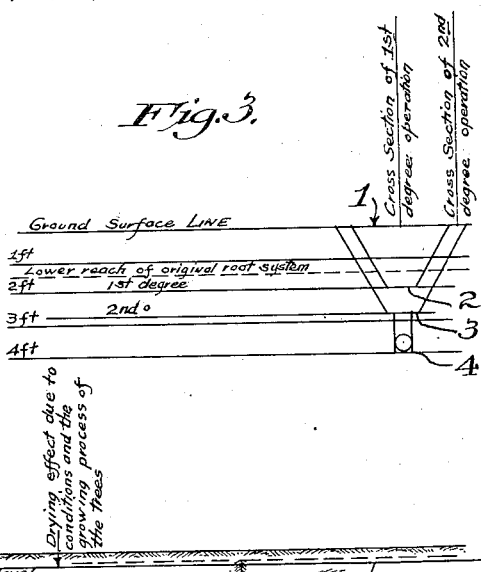

As shown in Fig. 2, the drainage ditch as indicated at 2, 3, 4, and 5, may be deepened by uniform increases in depth until it reaches the final drainage level 5, or as shown in Fig. 3, the drainage ditch may be lowered by successively increasing increments of depth, 2', 3', and 4'.

Figure 4:
Fig. 4 is a diagrammatic vertical section showing in a general way the lowering of the water table or water level by operation of this invention.

Fig. 4 illustrates the effect on the soil of the drainage operations resulting in lowering the water level in the ground from the original depth 6, near the surface, to a depth 7 which is sufficiently below the surface of the ground to enable the root system to penetrate the required depth for the purpose of this invention, it being understood that in general the root system will reach only substantially to the effective water level in the ground. This figure also illustrates the effect of capillarity in supply of moisture to the soil immediately above the water level and containing the effective root system.

In some cases I may provide for variation in horizontal spacing as well as vertical progressive increase in the drainage system, thus as shown in Figs. 5 and 6, the drainage operation may be started with comparatively shallow ditches 10 arranged, for example, between every second row of trees, these ditches being progressively deepened as shown at 11 and 12 and then, for the final stage, alternate ditches being deepened as shown at 15 and the intermediate ditches 10 being filled up.

It will be understood that when the final or lowermost depth for proper drainage is attained, suitable permanent drainage means such as tiles will generally be placed in the bottom of the ditches and the ditches may then be filled up. Such tiles will, of course, be laid with reference to the topography of the ground and be provided with means, such as open joints, for percolation of water thereinto. Any suitable distribution of the tiles may be adopted, as for example, single tiles as shown in Fig. 7 or multiple tiles as shown in Figs. 8 and 9.

Drainages will keep the ground water line at a permanent level, and the roots of the trees will reach for this level. If the section between the ground water line and the surface of the ground, hereinafter called the drained zone, is wide enough, the temperature of the soil, where the roots are located, will increase only gradually, and uniformly, during the early part of the growing season. The capillarity produced in the drained zone will contribute in decreasing and equalizing the temperature in the lower section of the zone, during the early part of the growing season. These will eliminate the forceful growth which, under the present conditions, causes bark fractures during the early part of the season.

The rain and irrigation water will percolate through the drained zone to the soil section below it, and, if this should become flooded, the surplus will be emptied by the drainages. The drained zone will prevent a rapid evaporation of moisture from the lower section, and, by cultivating the field properly, such evaporation can be still further reduced. The capillarity will furnish the roots with a sufficient amount of moisture to meet the demands of the tree, even during periods of high atmospheric temperature and hot drying winds. Thus, the sap flow in the trees will not be checked during the growing season.

The foodstuff builders will occupy a wider section than they do under the present conditions. The capillarity will, at all times, furnish them with moisture, which is essential for their processes. The foodstuffs thus produced throughout the drained zone will, by rain and irrigation water, be washed down to the roots, where they will be available for the life processes of the trees.

The fungi, which now shelter in the top soil of the field and on the vegetation growing in it, will largely be deprived of the favorable conditions under which they now thrive. This may contribute in reducing the hazard of diseases.

I claim:

1. The method of rendering plants resistant to bark disease which consists in establishing drainage means in the ground containing the root systems of the plants, and progressively lowering the depth of such drainage means to cause the plant root systems to progressively develop to lower levels.

2. A method as set forth in claim 1, wherein the horizontal spacing of the drainage means is increased when the drainage means reach their lowest level.

GUNDE BERGSTROM.